United States Patent
Li et al.

(10) Patent No.: US 12,516,882 B2
(45) Date of Patent: Jan. 6, 2026

(54) DRYING DEVICE AND ELECTRODE PLATE MANUFACTURING APPARATUS

(71) Applicant: CONTEMPORARY AMPEREX TECHNOLOGY (HONG KONG) LIMITED, Hong Kong (CN)

(72) Inventors: Yuting Li, Ningde (CN); Huan Che, Ningde (CN); Wei Chen, Ningde (CN); Shisong Li, Ningde (CN); Yalong Qing, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 465 days.

(21) Appl. No.: 18/098,246

(22) Filed: Jan. 18, 2023

(65) Prior Publication Data

US 2023/0235957 A1    Jul. 27, 2023

(30) Foreign Application Priority Data

Jan. 25, 2022  (CN) .......................... 202220209736.X

(51) Int. Cl.
  *F26B 21/00*  (2006.01)
  *B05D 3/02*  (2006.01)
  *F26B 3/02*  (2006.01)

(52) U.S. Cl.
  CPC .......... *F26B 21/004* (2013.01); *B05D 3/0272* (2013.01); *F26B 3/02* (2013.01)

(58) Field of Classification Search
  None
  See application file for complete search history.

(56) References Cited

U.S. PATENT DOCUMENTS

| | | | |
|---|---|---|---|
| 2013/0149466 A1* | 6/2013 | Nakano | H01M 4/0404 427/58 |
| 2014/0113066 A1 | 4/2014 | Fujita | |
| 2023/0175776 A1* | 6/2023 | Son | H01M 4/0471 34/443 |

FOREIGN PATENT DOCUMENTS

| | | |
|---|---|---|
| CN | 102423749 A | 4/2012 |
| CN | 202427624 U | 9/2012 |
| CN | 103779538 A | 5/2014 |

(Continued)

OTHER PUBLICATIONS

English Translation of JP 2020001383 (Year: 2020).*

(Continued)

*Primary Examiner* — Xiao S Zhao
(74) *Attorney, Agent, or Firm* — Scully, Scott, Murphy & Presser, P.C.

(57) ABSTRACT

The present application discloses a drying device and an electrode plate manufacturing apparatus. The drying device for drying a material comprises: a first oven section; a second oven section; and a third oven section, the first oven section, the second oven section and the third oven section being arranged sequentially in a movement direction of the material, wherein the second oven section has a larger air outlet area than the first oven section, and the first oven section has a larger air outlet area than the third oven section, such that the air speed of the first oven section is greater than that of the second oven section, and the air speed of the third oven section is greater than that of the first oven section. The solution provided by the present application can increase the production efficiency of batteries.

11 Claims, 3 Drawing Sheets

(56) References Cited

FOREIGN PATENT DOCUMENTS

CN 108906536 A 11/2018
JP 2020001383 A * 1/2020 ............. B29C 71/02

OTHER PUBLICATIONS

English Translation.*
Extended European Search Report dated Jul. 18, 2023 received in European Patent Application No. 23151864.8.

* cited by examiner

DRYING DEVICE AND ELECTRODE PLATE MANUFACTURING APPARATUS

CROSS-REFERENCE TO RELATED APPLICATIONS

This application claims priority to Chinese Patent Application No. 202220209736.X, filed on Jan. 25, 2022, which is hereby incorporated by reference in its entirety.

TECHNICAL FIELD

The present application relates to the technical field of batteries, and in particular to a drying device and an electrode plate manufacturing apparatus.

BACKGROUND ART

Achieving energy conservation and emission reduction is the key to the sustainable development of the automotive industry. Electric vehicles have become an important part of the sustainable development of the automotive industry due to their advantages in energy conservation and being environmentally friendly. For the electric vehicles, the battery technology is an important factor to their development.

During manufacturing batteries, the production efficiency of the batteries is a nonnegligible issue. Therefore, how to increase the production efficiency of the batteries is an urgent technical problem to be solved in the battery technology.

SUMMARY

The present application provides a drying device and an electrode plate manufacturing apparatus which can increase the production efficiency of batteries.

In a first aspect, a drying device for drying a material is provided, which comprises: a first oven section; a second oven section; and a third oven section, the first oven section, the second oven section and the third oven section being arranged sequentially in a movement direction of the material, wherein the second oven section has a larger air outlet area than the first oven section, and the first oven section has a larger air outlet area than the third oven section, such that the air speed of the first oven section is greater than that of the second oven section, and the air speed of the third oven section is greater than that of the first oven section.

According to a technical solution of an embodiment of the present application, the material moves and passes through the first oven section, the second oven section and the third oven section sequentially. The first oven section, the second oven section and the third oven section each provide an airflow for the material to dry a film layer on a surface of the material. Since the first oven section, the second oven section and the third oven section are supplied with air from the same air source, by adjusting respective air outlet areas of the first oven section, the second oven section and the third oven section, each oven section is allowed to provide an airflow at a different air speed to achieve different drying effects. The first oven section provides an airflow at a high air speed to quickly preheat the material. Before entering the first oven section, the film layer on the surface of the material is wet, and the wet film layer can be quickly preheated by the airflow at the high air speed in the first oven section with no damages to the film layer on the surface of the material. The second oven section provides an airflow at a low air speed to the material, which can provide slow evaporation for the material. By means of the airflow at the low air speed, a solvent in the wet film layer can be evaporated and damages to the film layer caused by an excessive air speed can be prevented. The third oven section is an oven section with the highest air speed among the three oven sections. Since the film layer on the material has been formed in the second oven section, a high-speed airflow is provided to the material, which can quickly dry the material, such that the wet film layer is formed into a dry film layer, thereby increasing the drying efficiency of the material and increasing the production efficiency of batteries.

In some embodiments, the first oven section has an air speed of less than 15 m/s, the second oven section has an air speed of less than 10 m/s, and the third oven section has an air speed of 15-30 m/s.

The air speeds of the first oven section, the second oven section and the third oven section are defined, such that it is possible to increase the drying efficiency of the material as much as possible while ensuring that the film layer of the material is not damaged, thereby increasing the production efficiency of the batteries while ensuring the quality of the batteries.

In some embodiments, the first oven section has a plurality of first tuyeres, the second oven section has a plurality of second tuyeres, and the third oven section has a plurality of third tuyeres; and both of the first tuyeres and the second tuyeres have a larger air outlet area than the third tuyeres.

Provision of the plurality of identical tuyeres in each of the oven sections (that is, the first oven section is provided with the plurality of first tuyeres, the second oven section is provided with the plurality of second tuyeres, and the third oven section is provided with the plurality of third tuyeres) can ensure the uniformity of air outlet of this oven section, such that the airflow can fully act on the material and thus the drying effect of each oven section is ensured. In addition, the air outlet area of the third tuyeres are set to be smaller than the air outlet areas of the first tuyeres and the second tuyeres in such a way that it can effectively ensure that the third oven section provides an airflow at a higher speed to the material than the first oven section and the second oven section to ensure quick drying of the material and to increase the drying efficiency of the material.

In some embodiments, in the movement direction of the material, the number of the tuyeres of each of the oven sections is not less than 15 per 5 m, and the center-to-center distance between two adjacent tuyeres is not greater than 0.3 m.

In each oven section, the number of tuyeres provided per 5 m is not less than 15, and the center-to-center distance between two adjacent tuyeres is not greater than 0.3 m, which can ensure the uniformity of the air outlet in the oven section and ensure that the airflow can effectively cover the material to ensure the drying quality and efficiency of the material.

In some embodiments, the air outlet area of the first oven section is not less than 255,000 $mm^2$/5 m; the air outlet area of the second oven section is not less than 375,000 $mm^2$/5 m; and the air outlet area of the third oven section is not less than 84,000 $mm^2$/5 m.

After defining the relative size of the air outlet area of each oven section, a minimum specific value of the air outlet area of each oven section is defined, and the air outlet area of the tuyeres can be calculated in the case of the minimum number of tuyeres, and thus the practicability of this scheme is improved to ensure that the drying device can complete the drying operation smoothly and efficiently.

In some embodiments, the volume of air of the first oven section accounts for 30-60% of the total volume of air of the drying device, the volume of air of the second oven section accounts for 15-35% of the total volume of air of the drying device, and the volume of air of the third oven section accounts for 20-40% of the total volume of air of the drying device.

Since the first oven section, the second oven section and the third oven section are supplied with air from the same air source, by limiting the ratio of the volume of air of each oven section to the total volume of air, the air source provides a respective volume of air corresponding to the numerical value to each oven section. In combination with the air outlet area of each of the oven sections, the oven section is allowed to provide an airflow at a different speed to achieve different drying effects, increasing the drying efficiency of the material while ensuring no damages to the film layer.

In some embodiments, the first tuyeres and the second tuyeres each comprise an air outlet face structure, and the air outlet face structure comprises a boosting part and an air outlet part which are superposed in an air outlet direction with a gap therebetween; and the boosting part is formed with a plurality of first slits at intervals, and the air outlet part is formed with a plurality of second slits, the first slits being staggered with the second slits.

The first tuyeres and the second tuyeres each comprise an air outlet face structure, and the air outlet face structure has the advantages of a simple structure and being easy to manufacture, which can effectively reduce the manufacturing cost of the drying device. With the provision of the boosting part and the air outlet part, the airflow passes through the first slits and the gap between the boosting part and the air outlet part, and is ejected from the second slits, which can improve the uniformity of the air outlet of the tuyeres, prevent damages to the film layer of the electrode plate due to turbulences, and ensure the drying effect of the material.

In some embodiments, the boosting part comprises a first frame and a plurality of first connecting portions arranged in the first frame, each of the first connecting portions is connected to the first frame at two ends, and the first slits are formed between two adjacent ones of the first connecting portions; and the air outlet part comprises a second frame and a plurality of second connecting portions arranged in the second frame, each of the second connecting portions is connected to the second frame at two ends, and the second slits are formed between two adjacent ones of the second connecting portions.

The boosting part has a simple structure and is easy to manufacture, and the plurality of first connecting portions are arranged at intervals in the first frame to form the first slits, which effectively reduces the manufacturing difficulty of the boosting part. The air outlet part has a simple structure and is easy to manufacture. The plurality of second connecting portions are arranged at intervals in the second frame to directly form the second slits, which can effectively reduce the manufacturing difficulty of the boosting part.

In some embodiments, the first connecting portions and/or the second connecting portions are hollow structures.

The first connecting portions and/or the second connecting portions are configured as hollow structures, such that the mass of the first tuyeres and the second tuyeres can be effectively reduced, and the material cost of the first tuyeres and the second tuyeres can be saved.

In a second aspect, the present application further provides an electrode plate manufacturing apparatus, comprising a coating device for coating a slurry on a surface of the electrode plate; and the drying device according to the first aspect, in a movement direction of the electrode plate, the drying device being disposed downstream of the coating device for drying the slurry on the electrode plate.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
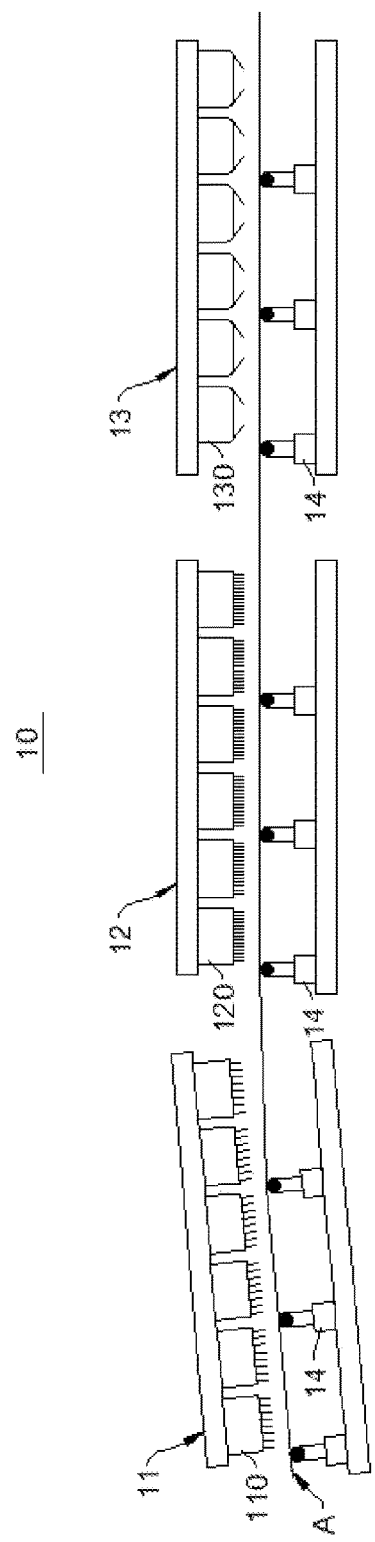
FIG. 1 is a schematic diagram of a drying device according to some embodiments of the present application.

List of reference signs: 10—Drying device; 11—First oven section; 110—First tuyere; 12—Second oven section; 120—Second tuyere; 13—Third oven section; 130—Third tuyere; 14—Roller; 15—Air outlet face structure; 150—Boosting part; 1500—First slit; 1501—First frame; 1502—First connecting portion; 151—Air outlet part; 1510—Second slit; 1511—Second frame; 1512—Second connecting portion.

DETAILED DESCRIPTION OF EMBODIMENTS

In order to make objects, technical solutions and advantages of embodiments of the present application clearer, the technical solutions in the embodiments of the present application will be clearly described below with reference to the drawings for the embodiments of the present application. Obviously, the described embodiments are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

The phrase "embodiments" referred to in the present application means that the descriptions of specific features, structures, and characteristics in combination with the embodiments are included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: presence of A, both A and B, or B. In addition, the character "/" in the present application generally indicates that the associated objects before and after the character are in an "or" relation.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated device are merely illustrative and should not be construed to limit the present application in any way.

"A plurality of" appearing in the present application means two or more (including two).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application.

A battery mentioned in the embodiments of the present application refers to a single physical module including one or more battery cells to provide a higher voltage and capacity. For example, the battery mentioned in the present application may include a battery module, a battery pack, etc. The battery generally includes a case for enclosing one or more battery cells. The case can prevent liquid or other foreign matters from affecting charging or discharging of a battery monomer.

The core member of the battery that can implement a repeated charge and discharge function is an electrode assembly in the battery cell. The electrode assembly comprises an electrode plate and a separator, the electrode plate including a positive electrode plate and a negative electrode plate. The separator is usually disposed between the positive electrode plate and the negative electrode plate for insulation of the positive electrode plate from the negative electrode plate, and the separator may be made of polypropylene (PP), polyethylene (PE), etc. The battery cell operates mainly by relying on movements of metal ions between the positive electrode plate and the negative electrode plate. The electrode plate comprises a current collector and an active material layer. The current collector has a coating area coated with an active material layer and an uncoated area not coated with an active material layer in a width direction of the electrode plate. Tabs are cut on the current collector not coated with the active material layer, and the tabs realize the charge and discharge of the electrode assembly. The current collector can be metal foil, such as copper foil, aluminum foil, and the like. A process for preparation of the electrode plate comprises a coating procedure in which a stirred slurry (i.e., the active material in the form of a slurry) is evenly applied on the current collector to form a film layer, and a drying procedure in which the film layer is dried to be a dry film layer so as to form the active material layer.

At present, from the development of the market situation, electric vehicles have become an important part of the sustainable development of the automotive industry. The battery provides energy for the running of a vehicle body and the operations of various electrical components in the vehicle body. For the electric vehicles, the battery technology is an important factor to their development. In the development of battery technology, how to increase the production efficiency of batteries is an urgent technical problem to be solved in the battery technology.

During the manufacturing of the battery, the efficiency of the drying procedure is one of the key factors affecting the production efficiency of the battery. The inventors have found that an airflow at a fixed air speed is usually used to dry the electrode plate in an existing drying procedure. When the slurry is just applied on the current collector to form a film layer, the film layer is unstable and is easily damaged by the airflow. In order to prevent the film layer from being damaged, the current collector is often dried at a lower fixed air speed, but the lower air speed impairs the drying efficiency of the electrode plate, which in turn influences the production efficiency of the battery.

Based on the above consideration, in order to increase the drying efficiency of the electrode plate to increase the production efficiency of the battery, the inventor has designed a drying device after in-depth studies, the drying device comprising: a first oven section; a second oven section; and a third oven section, the first oven section, the second oven section and the third oven section being arranged sequentially in a movement direction of the electrode plate, wherein the second oven section has a larger air outlet area than the first oven section, and the first oven section has a larger air outlet area than the third oven section, such that the air speed of the first oven section is greater than that of the second oven section, and the air speed of the third oven section is greater than that of the first oven section.

In the case of the same air source, that is, under the condition of a certain total volume of air, the air speed of each of the oven sections can be adjusted by adjusting the air outlet area of the oven section, thus providing different drying effects for the electrode plate at different times. The first oven section provides an airflow at a high air speed to quickly preheat a film layer on the electrode plate. The wet film layer (at this moment, the film layer is a wet film layer) can be quickly preheated by the airflow at the high air speed with no damages to the film layer on the surface of the material. The second oven section provides an airflow at a low air speed to the electrode plate to provide slow evaporation for the electrode plate. By means of the airflow at the low air speed, a solvent in the wet film layer can be evaporated and damages to the film layer caused by an excessive air speed can be prevented. The third oven section is an oven section with the highest air speed among the three oven sections. Since the film layer on the electrode plate has been formed after the evaporation in the second oven section, a high-speed airflow is provided to the electrode plate, which can quickly dry the electrode plate, such that the wet film layer is formed into a dry film layer, thereby increasing the drying efficiency of the electrode plate and increasing the production efficiency of the batteries. To this end, compared with a scheme of drying the electrode plate at a fixed lower air speed, this scheme provides airflows at different air speeds to the electrode plate according to different states of the film layer, which can increase the drying efficiency while ensuring the drying quality, thereby increasing the production efficiency of the batteries.

The drying device disclosed in the embodiments of the present application can be used, but not limited to, in an electrode plate manufacturing apparatus or other apparatuses that need to dry materials. The material mentioned in the embodiments of the present application may refer to an electrode plate, or other materials that have a film layer on its surface and need to be dried. An electrode plate is used as an example of the material for illustration below.

The technical solution described in the embodiments of the present application is applicable to an electrode plate manufacturing apparatus. The electrode plate manufacturing apparatus may refer to an apparatus that dries a current collector coated with an active material, or refer to an apparatus including a coating device and a drying device. The coating device is an apparatus that can evenly apply the active material to the current collector.

Referring to FIG. 1, FIG. 1 is a schematic diagram of a drying device 10 according to some embodiments of the present application. In FIG. 1, an electrode plate is denoted by the reference sign A. The drying device 10 for drying an electrode plate comprises a first oven section 11, a second oven section 12 and a third oven section 13. The first oven section 11, the second oven section 12 and the third oven section 13 are arranged sequentially in a movement direction of a material. The second oven section 12 has a larger air outlet area than the first oven section 11, and the first oven section 11 has a larger air outlet area than the third oven section 13, such that the air speed of the first oven section 11 is greater than that of the second oven section 12, and the air speed of the third oven section 13 is greater than that of the first oven section 11.

The first oven section 11, the second oven section 12 and the third oven section 13 can be parts that provide airflows to the electrode plate. Air outlet faces of the first oven section 11, the second oven section 12 and the third oven section 13 face the electrode plate, such that the airflows from the respective air outlet faces are blown to the surface of the electrode plate, wherein the airflows may be hot airflows. The first oven section 11, the second oven section 12 and the third oven section 13 are supplied with air from the same air source. In other words, an oven device comprises or is connected to an air supply unit which supplies air to the first oven section 11, the second oven section 12 and the third oven section 13 simultaneously such that the total volume of air of the first oven section 11, the second oven section 12 and the third oven section 13 is fixed. It should be explained that since the first oven section 11, the second oven section 12 and the third oven section 13 are supplied with air from the same air source, the air outlet speed of each oven section can be adjusted based on its respective air outlet area to ensure a controllable air outlet speed of the oven section.

Based on the formula that a volume of air is equal to an air speed multiplied by an air outlet area, if the total volume of air is fixed, controlling the air outlet area of each oven section can control the air speed of the oven section.

In some embodiments, referring to FIG. 1, the electrode plate is supported by rollers 14 on a side away from the first oven section 11, the second oven section 12 and the third oven section 13, so as to realize the feeding movement of the electrode plate.

According to the technical solution of the embodiment of the present application, the material moves and passes through the first oven section 11, the second oven section 12 and the third oven section 13 sequentially. The first oven section 11, the second oven section 12 and the third oven section 13 each provide an airflow for the material to dry a film layer on a surface of the material. Since the first oven section 11, the second oven section 12 and the third oven section 13 are supplied with air from the same air source, by adjusting respective air outlet areas of the first oven section 11, the second oven section 12 and the third oven section 13, each oven section is allowed to provide an airflow at a different air speed to the material to achieve different drying effects.

The first oven section 11 provides an airflow at a high air speed to quickly preheat the electrode plate. At this moment, the film layer on the surface of the material is wet, and the wet film layer can be quickly preheated by the airflow at the high air speed with no damages to the film layer on the surface of the material to reduce the flowability of the film layer and improve the uniformity of the thickness of the film layer. The second oven section 12 provides an airflow at a low air speed to the electrode plate, which can provide slow evaporation for the electrode plate. By means of the airflow at the low air speed, a solvent in the wet film layer can be evaporated and damages to the film layer caused by an excessive air speed can be prevented (an excessive air speed may result in excessively quick drying of the surface of the film layer, and vapor may flow and break through a dry film on the top to cause cracks in internal drying). The third oven section 13 is an oven section with the highest air speed among the three oven sections. Since the film layer on the electrode plate has been formed through the second oven section 12, a high-speed airflow is provided to the electrode plate, which can quickly dry the electrode plate, such that the wet film layer is formed into a dry film layer, thereby increasing the drying efficiency of the electrode plate and increasing the production efficiency of the batteries. To this end, compared with a scheme of drying the electrode plate at a fixed lower air speed, this scheme provides airflows at different air speeds to the electrode plate according to different states of the film layer, which can increase the drying efficiency while ensuring the drying quality, thereby increasing the production efficiency of the batteries.

In some embodiments according to the present application, the first oven section 11 has an air speed of less than 15 m/s, the second oven section 12 has an air speed of less than 10 m/s, and the third oven section 13 has an air speed of 15-30 m/s.

The first oven section 11 having an air speed of less than 15 m/s means that the maximum speed at which the first oven section 11 blows an airflow to the electrode plate is less than 15 m/s and greater than the air speed of the second oven section 12, for example, 10 m/s. The second oven section 12 having an air speed of less than 10 m/s means that the speed at which the second oven section 12 blows an airflow to the electrode plate is less than 10 m/s, for example, 4 m/s. The third oven section 13 having an air speed of 15-30 m/s means that the speed at which the third oven section 13 blows an airflow to the electrode plate is between 15 m/s and 30 m/s, for example, 15 m/s, 20 m/s, 25 m/s s or 30 m/s, etc.

The air speeds of the first oven section 11, the second oven section 12 and the third oven section 13 are defined, such that it is possible to increase the drying efficiency of the electrode plate as much as possible while ensuring that the film layer of the electrode plate is not damaged, thereby increasing the production efficiency of the batteries while ensuring the quality of the batteries.

In some embodiments according to the present application, referring to FIG. 1, the first oven section 11 has a plurality of first tuyeres 110, the second oven section 12 has a plurality of second tuyeres 120, and the third oven section 13 has a plurality of third tuyeres 130. Both of the first tuyeres 110 and the second tuyeres 120 have a larger air outlet area than the third tuyeres 130.

The tuyeres are components that can rectify the airflows, such that the airflow blown out by the oven can effectively act on the electrode plate, and the sum of the air outlet areas of all the tuyeres in the oven is equal to the air outlet area of the oven. Optionally, the oven comprises an oven body and a plurality of tuyeres, wherein the oven body has an air port in which the tuyeres are provided, and the oven body is supplied with air from an air source (such as the air supply unit), such that the airflow in the oven body is provided by each tuyere.

Provisions of the plurality of the first tuyeres 110 in the first oven section 11, the plurality of second tuyeres 120 in the second oven section 12, and the plurality of third tuyeres 130 in the third oven section 13 can ensure the uniformity of air outlet of each oven section and thus the drying effect of each oven section. In addition, the air outlet area of the third tuyeres 130 are set to be smaller than the air outlet areas of the first tuyeres 110 and the second tuyeres 120 in such a way that it can effectively ensure that the third oven section 13 provides an airflow at a higher air speed to the electrode plate than the first oven section 11 and the second oven section to ensure quick drying of the electrode plate.

Figure 2:
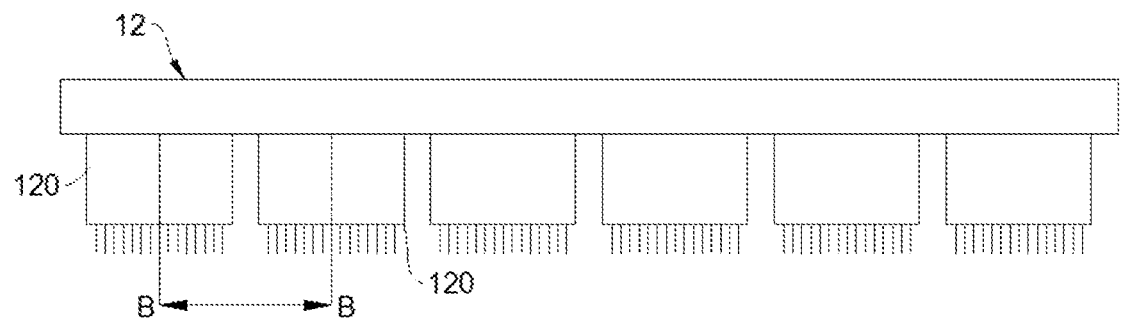
FIG. 2 is a schematic diagram of a second oven section according to some embodiments of the present application.

In some embodiments according to the present application, referring to FIG. 2, FIG. 2 is a schematic diagram of the second oven section according to some embodiments of the present application. In the movement direction of the electrode plate, the number of tuyeres of each of the oven sections is not less than 15 per 5 m, and the center-to-center distance between two adjacent tuyeres is not greater than 0.3 m.

In FIG. 2, the center-to-center distance between two tuyeres is indicated by an arrow plus a reference sign B.

Each oven section refers to any one of the first oven section 11, the second oven section 12 and the third oven section 13. In the first oven section 11, the tuyeres are the first tuyeres 110. In the second oven section 12, the tuyeres are the second tuyeres 120. In the third oven section 13, the tuyeres are the third tuyeres 130.

Each oven section extends along the movement direction of the electrode plate, and is arranged with a plurality of tuyeres in an extension direction thereof to ensure the drying effect of the electrode plate. In order to improve the drying effect of the electrode plate, with every 5 m as a unit, at least 15 tuyeres are arranged in each unit. The value of the center-to-center distance between two adjacent tuyeres affects the presence of an airflow in an area between the two tuyeres, and determines whether the electrode plate can be effectively dried in the area. For this, the center-to-center distance between the tuyeres is set to be not greater than 0.3 m, which can improve the drying effect of the electrode plate.

In each oven section, the number of tuyeres provided per 5 m is not less than 15, and the center-to-center distance between two adjacent tuyeres is not greater than 0.3 m, which can ensure the uniformity of the air outlet of the oven section and ensure that the airflow can completely cover the electrode plate to ensure the drying quality and efficiency of the electrode plate.

Optionally, each oven section may comprise a plurality of segments which each may be 5 m in length. In one embodiment, each oven section comprises three segments, and each oven section has a length of 15 m. As an example, the first oven section 11 comprises three segments, and the first oven section 11 has a total length of 15 m. The second oven section 12 comprises three sections, and the second oven section 12 has a total length of 15 m. The third oven section 13 comprises three segments, and the third oven section 13 has a total length of 15 m.

In some embodiments according to the present application, the air outlet area of the first oven section 11 is not less than 255,000 $mm^2$/5 m; the air outlet area of the second oven section 12 is not less than 375,000 $mm^2$/5 m; and the air outlet area of the third oven section 13 is not less than 84,000 $mm^2$/5 m.

Taking 5 m as a unit, the first oven section 11 has an air outlet area of at least 255,000 $mm^2$ per 5 m in its extension direction (if less than 255,000 $mm^2$, it will cause the air outlet speed of the first oven section 11 to be greater than 15 m/s, so the air flow speed is too high, resulting in a large force acting on the film layer and causing damages to the surface of the film layer), for example, the first oven section 11 has an air outlet area of 255,000 $mm^2$ per 5 m in other extension directions. The second oven section 12 has an air outlet area of at least 375,000 $mm^2$ per 5 m in its extension direction (if less than 375,000 $mm^2$, it will cause the air outlet speed of the second oven section 12 to be greater than 10 m/s, causing damages to the surface of the film layer), for example, the second oven section 12 has an air outlet area of 375,000 $mm^2$ per 5 m in other extension directions. The third oven section 13 has an air outlet area of at least 84,000 $mm^2$ per 5 m in its extension direction (if less than 84,000 mm2, it will cause the air outlet speed of the third oven section 13 to be greater than 30 m/s, so the air flow speed is too high, resulting in a large force acting on the film layer and causing damages to the surface of the film layer), for example, the third oven section 13 has an air outlet area of 84,000 mm2 per 5 m in other extension directions.

After defining the relative size of the air outlet area of each oven section, a minimum specific value of the air outlet area of each oven section is defined, and the air outlet area of the tuyeres can be calculated in the case of the minimum number of tuyeres, and thus the practicability of this scheme is improved to ensure that the drying device 10 can complete the drying operation smoothly and efficiently.

In some embodiments according to the present application, the volume of air of the first oven section 11 accounts for 30-60% of the total volume of air of the drying device 10, the volume of air of the second oven section 12 accounts for 15-35% of the total volume of air of the drying device 10, and the volume of air of the third oven section 13 accounts for 20-40% of the total volume of air of the drying device 10.

The percentage of the volume of air of the oven section accounting for the total volume of air of the drying device 10 means the distribution ratio of the volume of air, that is, the distribution ratio of the volume of air of the first oven section 11 is between 30-60%, the distribution ratio of the volume of air of the second oven section 12 is between 15-35%, and the distribution ratio of the volume of air of the third oven section 13 is between 20-40%. The above-mentioned distribution ratios of the volume of air allow the air speed of the first oven section 11 to be less than 15 m/s, the air speed of the second oven section 12 to be less than 10 m/s, the air speed of the third oven section 13 to be between 15-30 m/s. In the case of the numerical value of the total volume of air of 61689.6, with the distribution ratio of the volume of air of the first oven section 11 being 44.1%, the distribution ratio of the volume of air of the second oven section 12 being 26.5%, and the distribution ratio of the volume of air of the third oven section 13 being 29.4% as an example, the numerical value of the volume of air of the first oven section 11 is about 27216, the numerical value of the volume of air of the second oven section 12 is about 16329.6, and the numerical value of the volume of air of the third oven section 13 is about 18144. The volume of air can be expressed in $m^3/h$.

Since the first oven section 11, the second oven section 12 and the third oven section 13 are supplied with air from the same air source, by limiting the ratio of the volume of air of each oven section to the total volume of air, the air source provides a respective volume of air corresponding to the numerical value to each oven section. In combination with the air outlet area of each of the oven sections, the oven section is allowed to provide an airflow at a different air speed to achieve different drying effects, increasing the drying efficiency of the material while ensuring no damages to the film layer.

Figure 3:
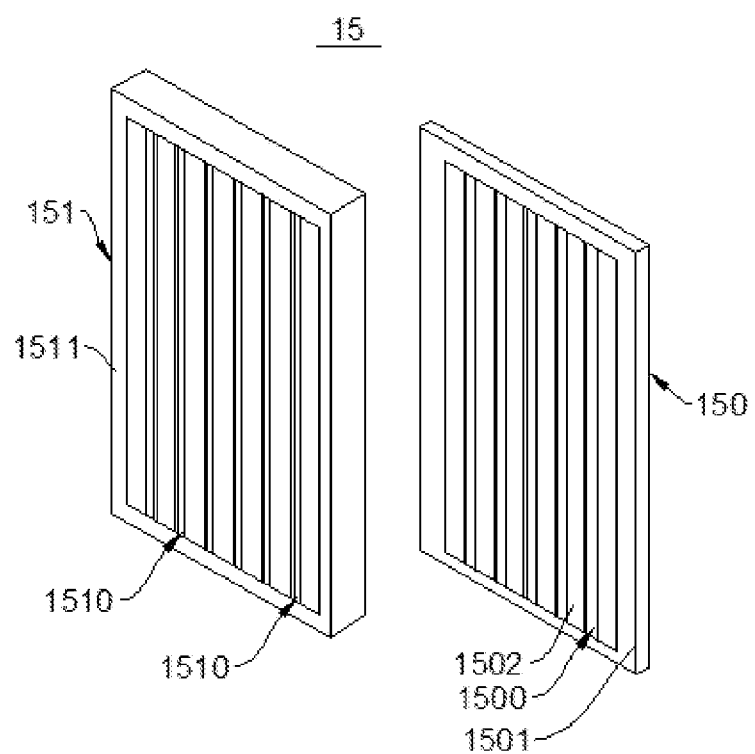
FIG. 3 is a perspective view of an air outlet face structure according to some embodiments of the present application.
Figure 4:
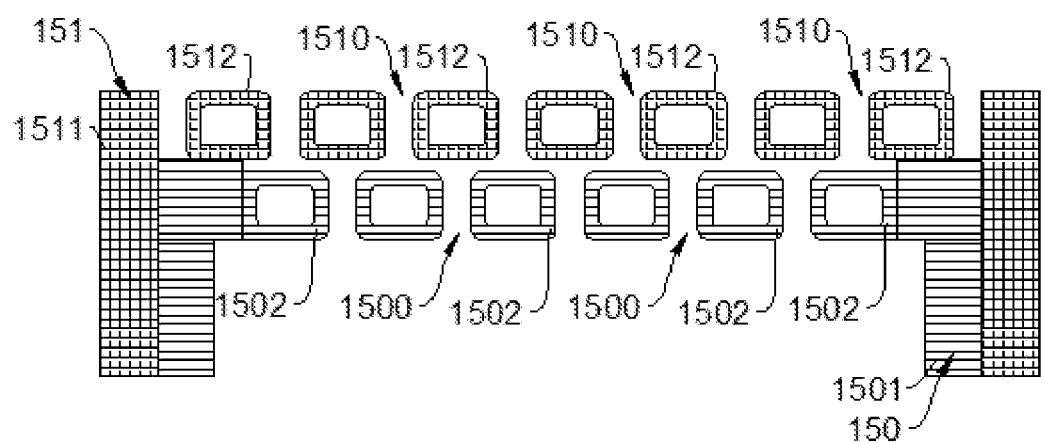
FIG. 4 is a cross-sectional view of an air outlet face structure according to some embodiments of the present application.

In some embodiments according to the present application, referring to FIGS. 3 and 4, FIG. 3 is a perspective view of an air outlet face structure according to some embodiments of the present application, and FIG. 4 is a cross-sectional view of an air outlet face structure according to some embodiments of the present application.

The first tuyeres 110 and the second tuyeres 120 each comprise an air outlet face structure 15, and the air outlet face structure 15 comprises a boosting part 150 and an air outlet part 151 which are superposed in an air outlet direction with a gap therebetween; and the boosting part 150 is formed with a plurality of first slits 1500 at intervals, and the air outlet part 151 is formed with a plurality of second slits 1510, the first slits 1500 being staggered with the second slits 1510.

The air outlet face structure 15 refers to a structure for blowing out an airflow, and the air outlet face structure 15 faces the electrode plate, such that the airflow flows to the electrode plate to dry the electrode plate. The boosting part 150 is a part arranged on a side of the air outlet part 151 away from the electrode plate. The first slits 1500 on the boosting part 150 allow the airflow to pass through, so as to increase the pressure of the airflow and make the airflow flow to the second slits 1510. The air outlet part 151 is a part facing the electrode plate, and the airflow is blown out from the second slits 1510 to act on the electrode plate. The sum of the air outlet areas of the second slits 1510 on the air outlet part 151 is equal to the air outlet area of the tuyeres (the first tuyeres 110 or the second tuyeres 120).

The cross-sectional area of the second slits 1510 of the first tuyeres 110 may be smaller than the cross-sectional area of the second slits 1510 of the second tuyeres 120, such that the air outlet area of the first tuyeres 110 is smaller than that of the second tuyeres 120, and thus the air outlet speed of the first oven section 11 is greater than that of the second oven section 12. Alternatively, when the cross-sectional area of the second slits 1510 of the first tuyeres 110 is equal to the cross-sectional area of the second slits 1510 of the second tuyeres 120, the number of the second slits 1510 of the first tuyeres 110 can be less than the number of the second slits 1510 of the second tuyeres 120, such that the air outlet area of the first tuyeres 110 is smaller than the air outlet area of the second tuyeres 120, and thus the air outlet speed of the first oven section 11 is greater than that of the second oven section 12.

The first tuyeres 110 and the second tuyeres 120 each comprise an air outlet face structure 15, and the air outlet face structure 15 has the advantages of a simple structure and being easy to manufacture, which can effectively reduce the manufacturing cost of the drying device 10. With the provision of the boosting part 150 and the air outlet part 151, the airflow passes through the first slits 1500, the gap between the boosting part 150 and the air outlet part 151, and is ejected from the second slits 1510, which can improve the uniformity of the air outlet of the tuyeres, prevent damages to the film layer of the electrode plate due to turbulences, and ensure the drying effect of the material.

Optionally, the structure of the third tuyeres 130 may be identical to that of tuyeres in an existing drying device or an existing oven.

In some embodiments according to the present application, as shown in FIGS. 3 and 4, the boosting part 150 comprises a first frame 1501 and a plurality of first connecting portions 1502 arranged in the first frame 1501, each of the first connecting portions 1502 is connected to the first frame 1501 at two ends, and the first slits 1500 are formed between two adjacent ones of the first connecting portions 1502; and the air outlet part 151 comprises a second frame 1511 and a plurality of second connecting portions 1512 arranged in the second frame 1511, each of the second connecting portions 1512 is connected to the second frame 1511 at two ends, and the second slits 1510 are formed between two adjacent ones of the second connecting portions 1512.

The first frame 1501 comprises a plurality of walls which are sequentially connected to have a form of a frame. The first connecting portions 1502 are parts disposed in the first frame 1501, the first connecting portions 1502 are connected to an inner wall of the first frame 1501, and a plurality of first connecting portions 1502 are arranged at intervals to form the plurality of first slits 1500. The second frame 1511 comprises a plurality of walls enclosing a frame. The second connecting portions 1512 are parts disposed in the second frame 1511, the second connecting portions 1512 are connected to an inner wall of the second frame 1511, and the plurality of second connecting portions 1512 are arranged at intervals to form the plurality of second slits 1510.

With respect to FIG. 4, the first connecting portions 1502 are located at one end of the first frame 1501, a chamber is formed between the first connecting portions 1502 and the other end of the first frame 1501, and the size of the second frame 1511 is smaller than that of the first frame 1501, such that the second frame 1511 can be placed in the chamber and a lateral wall of a wall of the second frame 1511 is in contact with the inner wall of the first frame 1501, and an end surface of the wall of the second frame 1511 facing the first connecting portions 1502 abuts against the first connecting portions 1502. The second connecting portions 1512 are disposed in the second frame 1511, and have a certain distance from the end surface of the second frame 1511 facing the first connecting portions 1502, such that when the second frame 1511 is placed in the first frame 1501, a gap is formed between the first connecting portions 1502 and the second connecting portions 1512 for an airflow to pass through.

The boosting part 150 has a simple structure and is easy to manufacture, and the plurality of first connecting portions 1502 are arranged at intervals in the first frame 1501 to form the first slits 1500, which effectively reduces the manufacturing difficulty of the boosting part 150. The air outlet part 151 has a simple structure and is easy to manufacture. The plurality of second connecting portions 1512 are arranged at intervals in the second frame 1511 to directly form the second slits 1510, which can effectively reduce the manufacturing difficulty of the boosting part 150.

Optionally, in the first tuyeres 110, the air outlet area of the air outlet part 151 accounts for 10-20% of the total area of the air outlet part 151, the widths of the first slits 1500 and the second slits 1510 are between 2-8 mm, the number of the first slits 1500 and the number of the second slits 1510 are between 4-12 respectively, and the total air outlet area of the air outlet part 151 is not less than 17,000 mm$^2$. In the second tuyeres 120, the air outlet area of the air outlet part 151 accounts for 20-40% of the total area of the air outlet part 151, the widths of the first slits 1500 and the second slits 1510 are between 2-8 mm, the numbers of the first slit 1500 and the number of the second slits 1510 are between 6-18 respectively, the total air outlet area of the air outlet part 151 is not less than 25,000 mm$^2$, and the gap between the boosting part 150 and the air outlet part 151 is between 2-5 mm.

Optionally, the cross sections of the first connecting portions 1502 and the second connecting portions 1512 may be square, such that the first slits 1500 and the second slits 1510 are strip-shaped, so as to ensure the uniformity of air outlet.

In some embodiments according to the present application, the first connecting portions 1502 and/or the second connecting portions 1512 are hollow structures.

A hollow structure refers to a component having a cavity therein. The interior of the hollow structure is configured as a cavity to enable to effectively reduce the mass and used materials of the component. The first connecting portions 1502 and/or the second connecting portions 1512 being hollow structures means that the first connecting portions 1502 are hollow structure, the second connecting portions 1512 are hollow structures, or both the first connecting portions 1502 and the second connecting portions 1512 are hollow structures.

The first connecting portions 1502 and/or the second connecting portions 1512 are configured as hollow structures, such that the mass of the first tuyeres 110 and the second tuyeres 120 can be effectively reduced, and the material cost of the first tuyeres 110 and the second tuyeres 120 can be saved.

Optionally, the first connecting portions 1502 and/or the second connecting portions 1512 may be rectangular tubes (square tubes) of materials which are not limited, such as stainless steel rectangular tubes, aluminum alloy rectangular tubes, or plastic rectangular tubes, etc.

Optionally, the materials of the first frame 1501 and the second frame 1511 are not limited, and the first frame and the second frame may be made of steel, an aluminum alloy, or plastics.

Some embodiments of the present application further provide an electrode plate manufacturing apparatus, comprising a coating device and the drying device 10 as described above, the coating device being configured for coating a slurry on a surface of an electrode plate. In a movement direction of the electrode plate, the drying device 10 is disposed downstream of the coating device for drying the slurry on the electrode plate.

The coating device is an apparatus that can evenly coat the slurry (an active material) on a current collector, i.e., the electrode plate. The drying device 10 is an apparatus that can quickly dry the slurry on the electrode plate.

The drying device 10 described above can increase the drying efficiency of the electrode plate while ensuring the drying quality of the electrode plate, thereby increasing the production efficiency of a battery.

Some embodiments of the present application further provide a drying device 10, see FIGS. 1-4. The drying device 10 comprises a first oven section 11, a second oven section 12 and a third oven section 13. The first oven section 11, the second oven section 12 and the third oven section 13 are arranged sequentially in a movement direction of an electrode plate. The first oven section 11, the second oven section 12 and the third oven section 13 are supplied with air from the same air source. The second oven section 12 has a larger air outlet area than the first oven section 11, and the first oven section 11 has a larger air outlet area than the third oven section 13, such that the air speed of the first oven section 11 is greater than that of the second oven section 12, and the air speed of the third oven section 13 is greater than that of the first oven section 11. In this embodiment, the first oven section 11 has an air speed of less than 15 m/s, the second oven section 12 has an air speed of less than 10 m/s, and the third oven section 13 has an air speed of 15-30 m/s.

In the movement direction of the electrode plate, the first oven section 11 is provided with at least 15 first tuyeres 110 per 5 m, such that the air outlet area of the first oven section 11 is not less than 255,000 mm$^2$/5 m; the second oven section 12 is provided with at least 15 second tuyeres 120 per 5 m, such that the air outlet area of the second oven section 12 is not less than 375,000 mm$^2$/5 m; and the third oven section 13 is provided with at least 15 third tuyeres 130 per 5 m, such that the air outlet area of the third oven section 13 is not less than 84,000 mm$^2$/5 m. In each oven section, the center-to-center distance between two adjacent tuyeres is not greater than 0.3 mm (that is, the minimum distance between adjacent first tuyeres is 0.3 mm, and the minimum distance between adjacent second tuyeres 0.3 mm, and the minimum distance between adjacent third tuyeres is 0.3 mm). The volume of air of the first oven section 11 accounts for 30-60% of the total volume of air of the drying device 10, the volume of air of the second oven section 12 accounts for 15-35% of the total volume of air of the drying device 10, and the volume of air of the third oven section 13 accounts for 20-40% of the total volume of air of the drying device 10.

In the first oven section 11 and the second oven section 12, the first tuyeres 110 and the second tuyeres 120 each comprises an air outlet face structure 15, and the air outlet surface structure 15 comprises a boosting part 150 and an air outlet part 151. The boosting part comprises a first frame 1501 of steel and a plurality of first connecting portions 1502, the first connecting portions 1502 being stainless steel rectangular tubes. The plurality of first connecting portions 1502 are arranged at intervals in the first frame 1501 to form a plurality of first slits 1500. The air outlet part 151 comprises a second frame 1511 of steel and a plurality of second connecting portions 1512, the second connecting portions 1512 being stainless steel rectangular tubes. The plurality of second connecting portions 1512 are arranged at intervals in the second frame 1511 to form a plurality of second slits 1510. The air outlet part 151 is placed in the first frame 1501 such that the first connecting portions 1502 and the second connecting portions 1512 are spaced apart from each other, and the first slits 1500 are staggered with the second slits 1510. The airflow in the oven passes through the first slits 1500 of the boosting part 150, then passes through the second slits 1510 of the air outlet part 151, and finally is blown to the electrode plate. In the first tuyeres 110, the air outlet area of the air outlet part 151 accounts for 10-20% of the total area of the air outlet part 151, and the widths of the first slits 1500 and the second slits 1510 are between 2-8 mm, the number of the first slits 1500 and the number of the second slits 1510 are between 4-12 respectively, and the total air outlet area of the air outlet part 151 is not less than 17,000 mm². In the second tuyeres 120, the air outlet area of the air outlet part 151 accounts for 20-40% of the total area of the air outlet part 151, the widths of the first slits 1500 and the second slits 1510 are between 2-8 mm, the numbers of the first slit 1500 and the number of the second slits 1510 are between 6-18 respectively, the total air outlet area of the air outlet part 151 is not less than 25,000 mm², and the gap between the boosting part 150 and the air outlet part 151 is between 2-5 mm.

For ease of understanding, this embodiment provides Table 1 to clearly illustrate the data of various factors in the oven device.

In Table 1, volume of air=air speed*total air outlet area of a single oven section*number of ovens sections/1000000*3600. The distribution ratio of the volume of air may range from: 30-60% for the first oven section 11, 15-35% for the second oven section 12 and 20-40% for the third oven section 13. The number of the tuyeres of each oven section is 15, and the total volume of air of the oven device is 61689.6 m²/h.

TABLE 1

| Oven sections | Air speed range (m/s) | Actual value of air speed | Air outlet area of single tuyere (mm²) | Air outlet area of single oven section (5 m) (mm²) | Number of oven sections (quantity) | Total volume of air of each oven section | Distribution ratio of volume of air |
|---|---|---|---|---|---|---|---|
| First oven section | Less than 15 | 10 | 16800 | 252000 | 3 | 27216 | 44.1% |
| Second oven section | Less than 10 | 4 | 25200 | 378000 | 3 | 16329.6 | 26.5% |
| Second oven section | 10-30 | 20 | 5600 | 84000 | 3 | 18144 | 29.4% |

The foregoing descriptions are merely preferred embodiments of the present application, but are not intended to limit the present application. For those skilled in the art, the present application may have various modifications and variations. Any modifications, equivalent substitutions, improvements, and the like made within the spirit and principle of the present application should fall within the scope of protection of the present application.

What is claimed is:

1. A drying device for drying a material, comprising:
   a first oven section;
   a second oven section; and
   a third oven section, the first oven section, the second oven section and the third oven section being arranged sequentially in a movement direction of the material,
   wherein the second oven section has a larger air outlet area than the first oven section, and the first oven section has a larger air outlet area than the third oven section;
   wherein the first oven section has a plurality of first tuyeres, the second oven section has a plurality of second tuyeres, and the third oven section has a plurality of third tuyeres, and
   both of the first tuyeres and the second tuyeres have a larger air outlet area than the third tuyeres;
   the first tuyeres and the second tuyeres each comprise an air outlet face structure, and the air outlet face structure comprises a boosting part and an air outlet part which are superposed in an air outlet direction with a gap therebetween; and
   the boosting part is formed with a plurality of first slits at intervals, and the air outlet part is formed with a plurality of second slits, the first slits being staggered with the second slits.

2. The drying device according to claim 1, wherein the first oven section has an air speed of less than 15 m/s, the second oven section has an air speed of less than 10 m/s, and the third oven section has an air speed of 15-30 m/s.

3. The drying device according to claim 1, wherein in the movement direction of the material, the number of the tuyeres, of each of the oven sections, is not less than 15 per 5 m, and the center-to-center distance between two adjacent tuyeres is not greater than 0.3 m.

4. The drying device according to claim 3, wherein the air outlet area of the first oven section is not less than 255,000 mm²/5 m; the air outlet area of the second oven section is not less than 375,000 mm²/5 m; and the air outlet area of the third oven section is not less than 84,000 mm²/5 m.

5. The drying device according to claim 4, wherein the volume of air of the first oven section accounts for 30-60% of the total volume of air of the drying device, the volume of air of the second oven section accounts for 15-35% of the total volume of air of the drying device, and the volume of air of the third oven section accounts for 20-40% of the total volume of air of the drying device.

6. The drying device according to claim 1, wherein the boosting part comprises a first frame and a plurality of first connecting portions arranged in the first frame, each of the first connecting portions is connected to the first frame at two ends, and the first slits are formed between two adjacent ones of the first connecting portions.

7. The drying device according to claim 6, wherein the first connecting portions are hollow structures.

8. The drying device according to claim 1, wherein
the air outlet part comprises a second frame and a plurality of second connecting portions arranged in the second frame, each of the second connecting portions is connected to the second frame at two ends, and the second slits are formed between two adjacent ones of the second connecting portions.

9. The drying device according to claim 8, wherein
the second connecting portions are hollow structures.

10. The drying device according to claim 1, wherein an oven device comprises or is connected to an air supply unit, the air supply unit supplying air to the first oven section, the second oven section and the third oven section simultaneously.

11. An electrode plate manufacturing apparatus, comprising:
a coating device for coating a slurry on a surface of the electrode plate; and
a drying device for drying a material which comprises:
a first oven section;
a second oven section; and
a third oven section, the first oven section, the second oven section and the third oven section being arranged sequentially in a movement direction of the material,
wherein the second oven section has a larger air outlet area than the first oven section, and the first oven section has a larger air outlet area than the third oven section, in a movement direction of the electrode plate, the drying device being disposed downstream of the coating device for drying the slurry on the electrode plate;
wherein the first oven section has a plurality of first tuyeres, the second oven section has a plurality of second tuyeres, and the third oven section has a plurality of third tuyeres, and
both of the first tuyeres and the second tuyeres have a larger air outlet area than the third tuyeres;
the first tuyeres and the second tuyeres each comprise an air outlet face structure, and the air outlet face structure comprises a boosting part and an air outlet part which are superposed in an air outlet direction with a gap therebetween; and
the boosting part is formed with a plurality of first slits at intervals, and the air outlet part is formed with a plurality of second slits, the first slits being staggered with the second slits.

\* \* \* \* \*